Patented Nov. 19, 1940

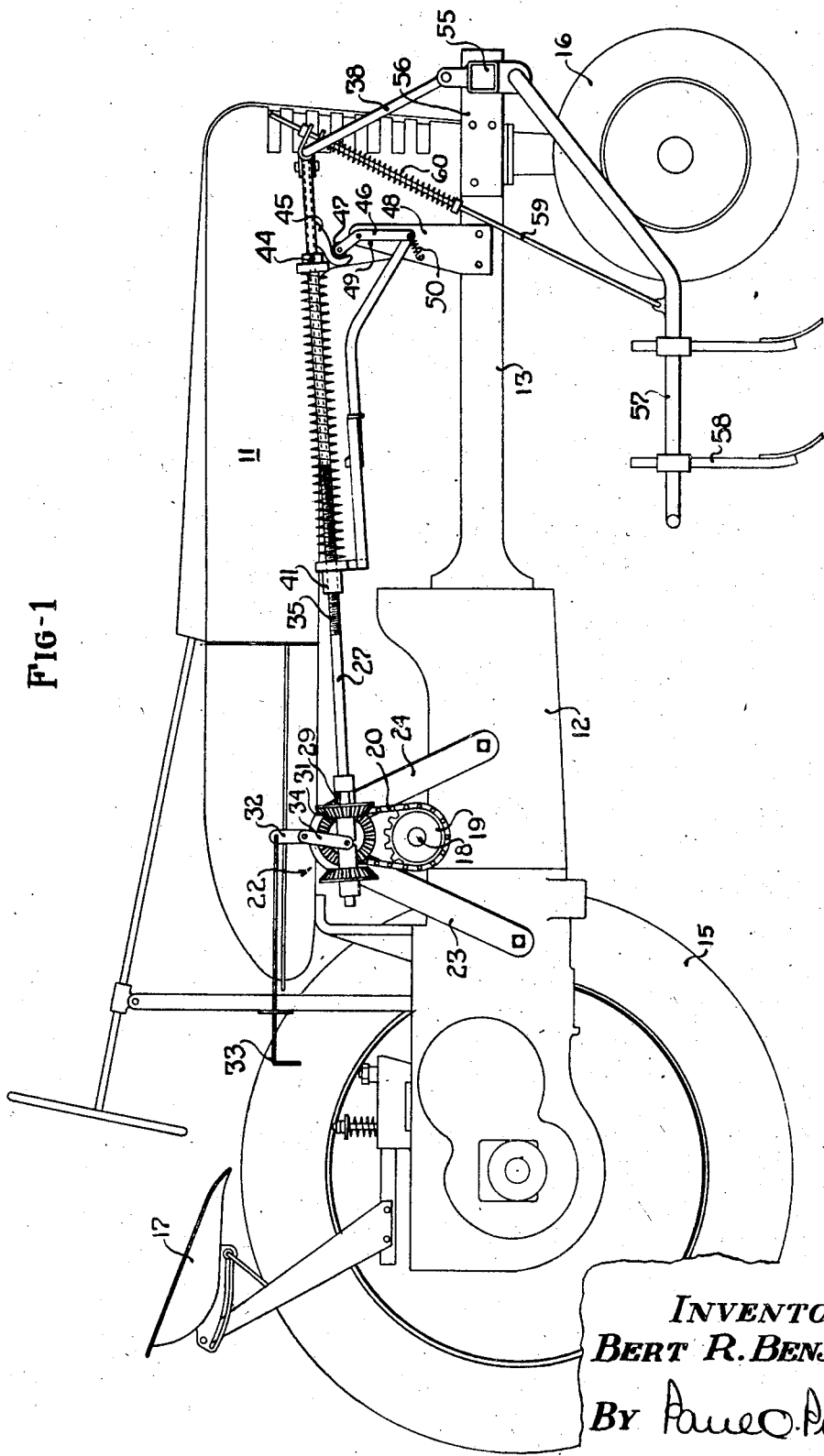

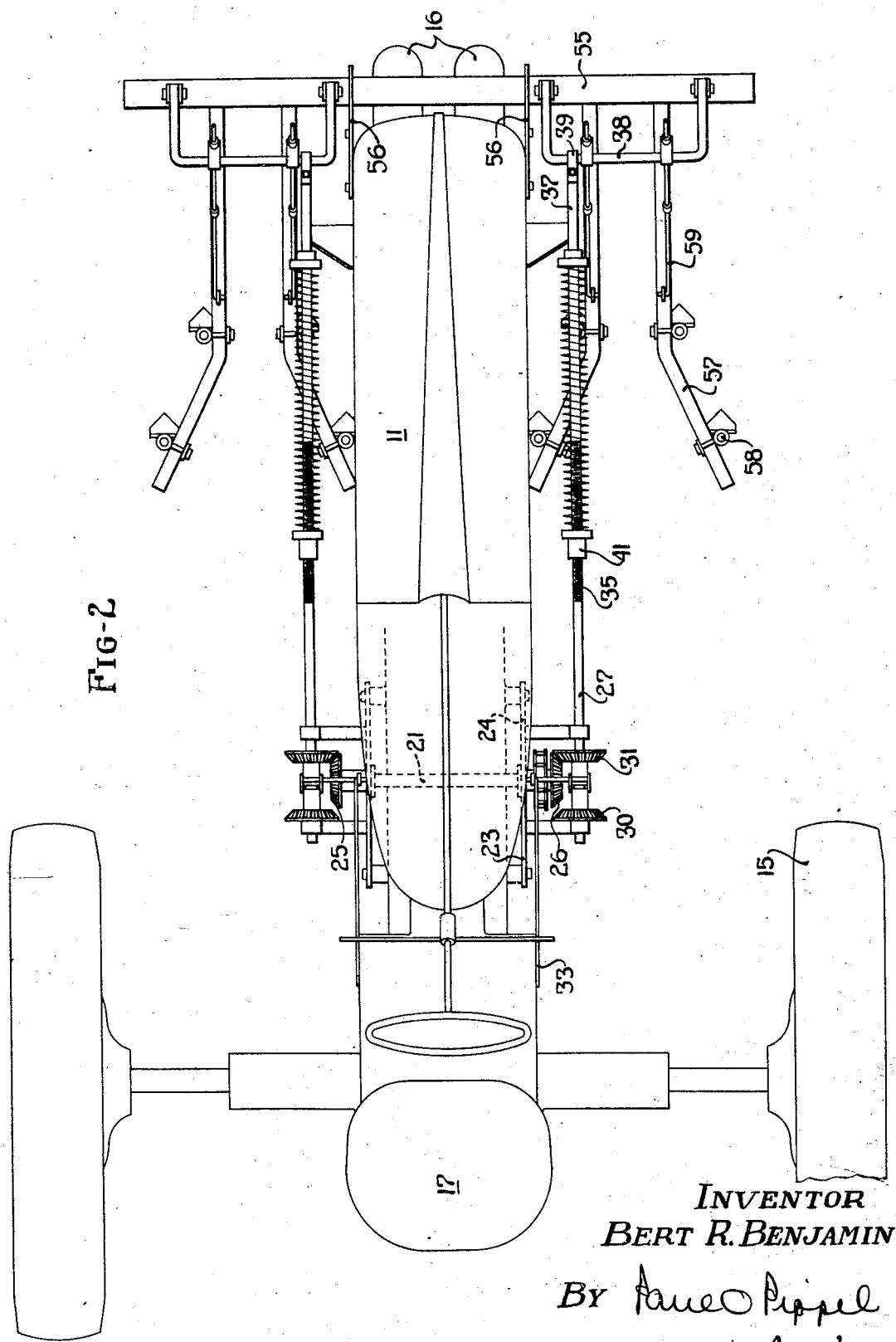

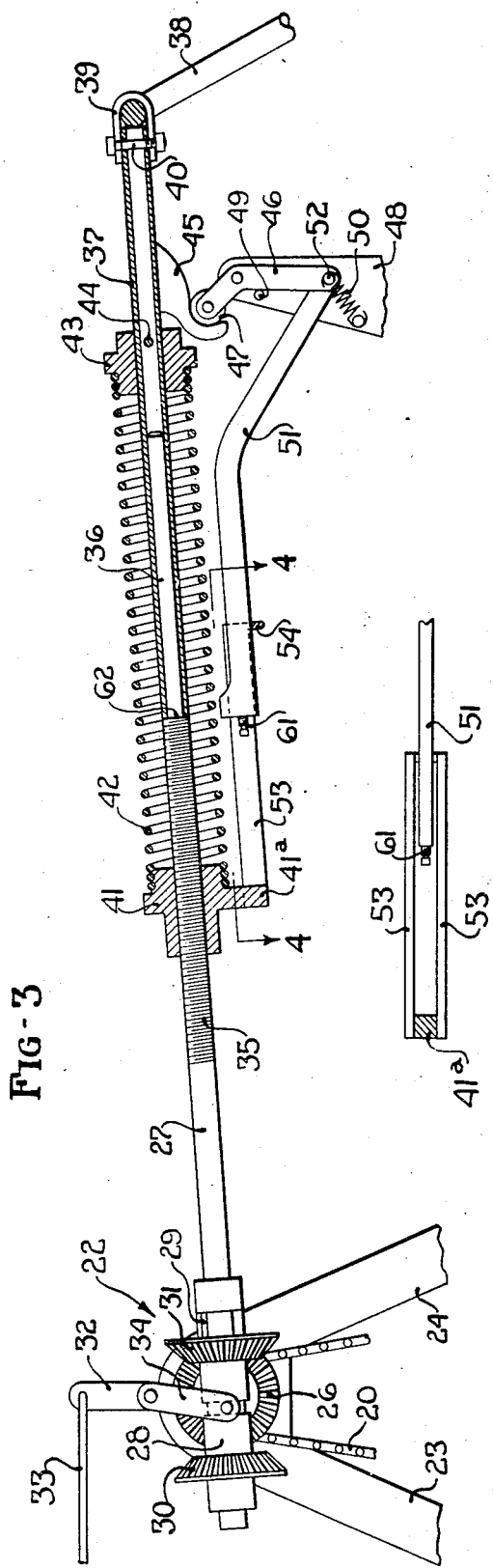

2,221,751

UNITED STATES PATENT OFFICE 2,221,751

IMPLEMENT LIFTING MEANS

Bert R. Benjamin, Oak Park, Ill., assignor to International Harvester Company, a corporation of New Jersey Application January 26, 1940, Serial No. 315,818

20 Claims. (Cl. 97—50)

This invention relates to an implement lifting means for tractors or for implement-carrying frames where the implement is directly connected and adapted to be vertically moved from one position to another.

In this lifting means, power is used for building up energy in a biasing means, and this energy is later released for the actual lifting of the implement.

It is an object of this invention to provide a lifting means for implements on tractors which is of simple construction and which has a minimum of movable parts.

It is another object of the invention to utilize the energy placed in a spring for effecting the lifting of the implement upon release of this energy.

It is still another object of the invention to provide means associated with the lifting means whereby the spring so used for lifting of the implement can also be used for placing a holddown pressure on the implement gangs.

It is still a further object of the invention to provide means which is automatic for releasing the bias on the spring biasing means automatically when a predetermined bias or pressure of the spring has been obtained.

According to the present invention there is provided generally a spring biasing means which is connected to the implement to move or lift the same and which is further connected to a power device adapted to receive power from the power take-off of the tractor. This power device is selectively operable in two directions to place the spring biasing means either in compression or in tension. When the spring biasing means has been placed under a predetermined bias or compression, automatic means is associated with the power device to release the spring biasing means whereby it immediately comes into play to effect lifting of the implement. The power device is operable in another direction to effect a tensioning bias on the spring whereby a desired holddown pressure may be placed on the implement. By a manually operable arrangement, the operator can selectively place the spring for the purpose of lifting of the implement or for the purpose of applying pressure to the implement when in its ground-working position. Means is also provided whereby the predetermined bias on the spring may be adjusted to effect release of the spring for a different biasing of the same.

For a better understanding of the invention, reference may be had to the following detailed description taken in connection with the accompanying drawings, in which:

Figure 1 is an elevational view of a tractor having an implement connected thereto, to which is connected the lifting means of the present invention;

Figure 2 is a plan view of the same tractor showing the arrangement of the implements at both sides of the tractor with a lifting device located respectively at each side thereof for the operation of those implement gangs on the respective sides;

Figure 3 is an enlarged view of the lifting means of the present invention; and, Figure 4 is a detail view, taken on the lines 4—4 of Figure 3, illustrating specifically the adjustment for the releasing means.

Referring now to the figures, there is shown generally a tractor 11 having a transmission and differential housing 12 and forwardly extending side members 13. The housing 12 is supported on the rear wheels 15, while the forward portion of the tractor is supported on the steerable wheels 16 adapted to be operated from an operator's station 17. From the transmission and differential gear housing 12 protrudes a power take-off 18 having a sprocket gear 19 connected by means of a chain 20 to a rotatable shaft 21 of a power device indicated generally at 22, and this shaft extends transversely with respect to the gear housing 12. This shaft is supported on the top of the gear housing by supports 23 and 24 and has rotative movement with respect thereto in the upper ends of the same. Directly carried by the shaft there are two level out-put gears 25 and 26 located so as to be at the respective sides of the tractor. Since the lifting means is the same on each side of the tractor, the description will be applied to only the one lifting means on one side of the tractor.

The power device 22 also includes a rotatable shaft 27 extending generally longitudinally of the tractor, on the rearward end of which is slidably connected a sleeve 28 held against rotative movement with respect to the rotatable member 27 by means of a key 29. This sleeve 28 has integrally formed therewith opposing bevel gears 30 and 31. The sleeve can be adjusted along the rotatable member 27 to place either the gear 30 or the gear 31 into engagement with the bevel gear 26 of the rotatable member 21. This means for effecting selective movement of the sleeve 28 comprises a lever 32 pivoted on the tractor and adapted to be operated by a rod 33 from the operator's station 17. This lever 32 carries a yoke portion 34 for permitting rotation of the sleeve with respect thereto.

The forward portion of the rotatable member 27 is threaded a considerable distance therealong, as indicated at 35, and also has at its forwardmost end a pilot or telescoping portion 36, see Figure 3, adapted to fit into the end of a pipe 37 having its forward end pivotally connected to a lifting bail 38 mounted for pivotal movement on the side bars 13 of the tractor. The connection for the forward end of the pipe 37 with the bail 38 includes a U-shaped strap 39 bolted at the end of the pipe by means of a bolt 40.

On the threaded portion 35 of the rotatable member 27, there is threadedly connected a head member 41, which has fixed therewith a biasing spring means 42, the other end of which is connected to a head member 43 made rigid with the pipe 37 by means of a pin 44. The biasing means being used in this instance is merely that of a coil spring extending substantially longitudinally of the tractor and surrounding portions of both the rotatable member 27 and of the pipe member 37. The connections of the ends of the spring 42 with the head members 41 and 43 is such that the spring may be placed under tension, and the connection with the head members being maintained therewith.

Also connected to the pipe member 37 is a downwardly extending hook-shaped member 45 adapted to be engaged at its lower end by a pivoted latch means 46 having a roller 47 adapted for contact with the hook 45. This pivoted latch means is supported by an upwardly extending bracket 48 carried on the side bar 13 of the tractor and has a stop member 49, against which the latch is maintained by a spring 50. As a means for operating this latch, there is provided a rearwardly extending link 51 pivotally connected to the lower end of the latch at 52, and the rear end of which is adapted to seat on a forwardly extending projection 53 on the head member 41. The forwardly extending projection 53 has a seat 54 at its forwardmost end, on which the loose end of the link 51 rests. The operation of this automatic latch tripping means will be described hereinafter.

Across the front of the tractor is a transversely extending tool bar 55, on which the lifting bails 38 are pivoted. This transverse member may be supported on brackets 56 rigidly connected to the side members 13. Pivoted for vertical movement on the transverse member 55 are implements 57 having ground-working tools 58. The adjustment of these implements about their pivotal connection with the transverse member 55 is effected in the usual manner by the clockwise rotation of the link 38, as viewed in Figure 1, the upper end of the link 38 being connected by means of lifting rods 59 with the implements 56. These lifting rods may contain individual pressure springs 60.

In the operation of the lifting means the power device 22 may be so arranged as to have either of the gears 30 or 31 in engagement with the gear 26. Assuming that it is desired to effect lifting of the implement 57, the hand rod 33 is pushed forwardly, so that the gear 31 engages with the gear 26. With the gear 26 rotating in a clockwise direction, and assuming that the threaded portion 35 of the rotatable member 27 is that of a right-hand thread, the rotatable member 27 will tend to screw itself out of the head member 41, but the rotatable member 27, being fixed against longitudinal movement, the head member 41 will travel forwardly, causing the spring 42 to be compressed. The forward end of the spring 42 in the meantime is held against movement by the latch device 46. As the head member 41 travels sufficiently forward to place a predetermined bias on the spring 42, the portion 41a (see Figures 3 and 4) will contact with the head of an adjustable screw 61 carried by the forward end of the link 51. The continued forward movement of the head 41 will take with it the link 51, so that the roller 47 is rolled out of contact in a counter-clockwise direction with the hook member 45 thereby releasing the spring and permitting the pipe 37 to move forwardly ahead of the rotatable member 27 to immediately effect lifting of the implement 57. The latch 46 will thereby be free from the hook member 45 and the pivotal link 38 will have moved forwardly to effect lifting of the implement through the lift rod 59.

When it is desired to lower the implement 57, the hand rod 33 is moved rearwardly to place the gear 30 into contact with the gear 26. A reverse rotation is thereby given to the rotatable member 27, so that it tends to screw itself into the head member 41 to thereby cause rearward movement of the same. The spring 42 is thereby placed in tension to effect pulling of the pipe 37 rearwardly until the hook member 45 engages with the latch 46. Once the engagement of the hook is made with the latch, the implements 57 are then located in their ground-working position.

Should it be desired to place a heavy spring pressure on the implements 57 to hold the same in the ground, continued rearward movement of the head member 41 may be effected. The pipe 37 will then abut the threaded portion of the rotatable member 27 at 62 where there is provided a shoulder due to the reduced diameter of the pilot or telescoping portion 36. This placing of tension upon the spring may even cause the hook 45 to leave rearwardly the contact roller 47 of the latch device 46. To arrest the tensioning movement of the spring and the head member 41, the yoke 32 can be rotated to place the gears 30 and 31 in a neutral position, the gears 30 and 31 being normally held out of engagement when the implement is in its ground-working position.

The adjustable screw 61 serves as means for varying the length of the link 51, or in effect varying the predetermined bias to be placed on the spring 42 for effecting the lift of the implement. More or less compression of the spring 42 may be governed by the setting of this adjusting screw 61. The portion 41a of the movable head member 41 merely contacts with the adjusting screw 61 to release the head 43 at a sooner or later time, depending upon the adjustment of the screw 61.

It should now be seen that there has been provided a lifting means for implements carried by an implement frame or by a tractor wherein the actual lifting of the implement is effected immediately upon the release of a spring, power only being used to place a bias on the spring. Also, it should be seen that this same spring device may be used for placing a heavy pressure on the implements when it is desired in hard ground. It should also be readily seen that the lifting means of the present invention is automatic in its operation and that it is of simple construction.

While various changes may be made in the details of construction of this lifting means, it shall be understood that such changes shall be made within the spirit and scope of the present invention as defined in the appended claims.

What is claimed is:

1. In combination, an implement-carrying frame, an implement connected to the frame for vertical movement, biasing means associated with the implement to move the same, means for placing a bias on the biasing means, and means for releasing the biasing means, whereby movement of the implement will be effected.

2. In combination, an implement-carrying frame, an implement connected to the frame for vertical movement from one position to another position, spring biasing means associated with the implement to move the same, means for compressing the spring biasing means, and means for releasing the compressed spring biasing means, whereby movement of the implement will be effected.

3. In combination, a tractor having a power take-off, an implement connected to the tractor for vertical movement, connections between the power take-off and the implement to move the same including biasing means, means for placing a bias on said biasing means, and means for releasing the bias on the biasing means, whereby movement of the implement will be effected.

4. In combination, a tractor, a ground-working implement connected to the tractor for vertical adjustment to and from its ground-working position, spring biasing means on the tractor and connected to said implement for adjusting the implement, means for placing a bias on said spring biasing means, and means for releasing said spring biasing means whereby adjustment of the implement will be effected to raise the implement from its ground-working position.

5. In combination, an implement-carrying frame, an implement connected to the frame for movement from one position to another position, spring biasing means associated with the implement to move the same, means for placing a bias on the spring biasing means, and means for automatically releasing said spring biasing means when a predetermined bias has been obtained, whereby movement of the implement from one position to another position will be effected.

6. In combination, an implement-carrying frame, an implement connected to the frame for movement from one position to another position, spring biasing means associated with the implement to move the same, means for placing a bias on the spring biasing means including means for automatically releasing said spring biasing means when a predetermined bias has been given to the same, whereby movement of the implement from one position to another position will be effected.

7. In a lifting means for implements adapted to be directly connected to tractors for vertical adjustment, a spring adapted to be connected to the implement, a power device adapted to be connected to the power take-off of the tractor connected to the spring to place a bias on the same, and means for releasing the effect of the power device upon the spring, whereby the energy stored in the spring becomes effective to adjust the implement.

8. In a lifting means for implements adapted to be directly connected to tractors for vertical adjustment, a spring adapted to be connected to the implement, a power device adapted to be connected to the power take-off of the tractor connected to the spring to place a bias on the same, and means associated with the power device to automatically release the effect of the power device upon the spring, whereby the energy stored in the spring becomes effective to adjust the implement.

9. In a lifting means for implements adapted to be directly connected to tractors for vertical adjustment, a spring adapted to be connected to the implement, a power device adapted to be connected to the power take-off of the tractor connected to the spring to place a bias on the same, means for automatically releasing the effect of the power device upon the spring to cause the spring to adjust the implement, and adjustable means for varying the time of operation of the releasing means.

10. In combination, an implement-carrying frame, an implement connected to the frame for vertical movement to and from a ground-working position, a spring connected to the implement, means for placing the spring either under a tensioning bias or under a compression bias, said spring being arranged so that when placed under one bias the energy stored may be used for moving the implement from the ground-working position and when placed under the other bias the energy may be used to place a hold-down pressure on the implement to keep the same in the ground.

11. In combination, a tractor having a power take-off, an implement connected to the tractor for vertical lifting movement, a power device connected to the power take-off to derive power therefrom and including an out-put member, a spring of sufficient capacity to lift the implement when placed under a predetermined bias connected to the implement to lift the same and connected to the out-put member to be given the predetermined bias, and means for releasing the spring to utilize the energy stored in the same by the power device, whereby the lifting of the implement is effected.

12. In combination, a tractor having a power take-off, an implement connected to the tractor for vertical lifting movement, a power device connected to the power take-off to derive power therefrom and including a rotatable out-put member having a threaded portion thereon, a spring of sufficient capacity to lift the implement when placed under a predetermined bias connected thereto to lift the same, a threaded member for connecting the spring to said threaded portion to be worked by the same, and means for releasing the spring to ultilize the energy stored in the same by the power device, whereby the lifting of the implement is effected.

13. In combination, a tractor having a power take-off, an implement connected to the tractor for vertical lifting movement, a power device connected to the power take-off to derive power therefrom and including a rotatable output member having a threaded portion, a spring of sufficient capacity to lift the implement when placed under a predetermined bias connected thereto to lift the same, a threaded head member for connecting the spring to the threaded portion of said rotatable member to be progressed therealong, latch means for retaining said spring while being placed on a bias, and automatic means upon the head member being progressed a predetermined distance for unlatching said latch means, whereby lifting of the implement will be effected.

14. In combination, an implement-carrying frame, an implement connected to the frame for movement with respect thereto, a spring of sufficient capacity to lift the implement when placed under a bias connected thereto to lift the same, means adapted to place a bias on the spring including a rotatable member having a threaded portion, a threaded head member for connecting the spring to the threaded portion of said rotatable member to be progressed therealong, latch means for retaining said spring while being placed on a bias, and automatic means upon the head member being progressed a predetermined distance for unlatching said latch means, whereby the lifting of the implement will be effected.

15. In combination, an implement-carrying frame, an implement connected to said frame for vertical lifting movement, a lifting lever pivoted on the frame and connected to the implement, a tubular member pivotally connected at one end to the lifting lever and having a head member fixed thereto, a lifting spring coiled about said tubular member and connected to the head member thereof, means for placing a bias on said spring including a rotatable member having a threaded portion and a portion telescoping with said tubular member, a threaded head member for connecting the spring to the threaded portion of said rotatable member, latch means associated with said tubular member for retaining said spring while it is being placed on a bias by the threaded member upon being progressed by the rotatable member, and means for unlatching said latch means to release said spring whereby lifting of the implement will be effected.

16. In combination, a tractor having a front portion and a power take-off, an implement connected to the front portion for vertical lifting movement, a lifting lever pivoted on the front portion of the tractor, a power device adapted to derive power from the power take-off including a rotatable member having a threaded portion and a projected portion, a tubular member telescoping with said projected portion for connecting the same with said lifting lever, a lifting spring coiled about the rotatable and tubular members, a threaded member on the threaded portion of the rotatable member to be progressed thereby, said spring interconnecting the tubular member and the threaded member, latch means associated with said tubular member for retaining said spring while the threaded member is being progressed to place the spring on a bias, and means for unlatching said latch means to release said spring so that the tubular member will telescope over the projected portion, whereby lifting of the implement will be effected.

17. In combination, a tractor having a power take-off, an implement connected at each side of the tractor for vertical movement, a shaft extending transversely across the tractor and connected to the power take-off to be driven thereby, an out-put gear at each side of the tractor adapted to be optionally engaged with said shaft, a rotatable shaft associated with each of the respective gears having a threaded portion, a lifting spring connected respectively with each implement and with each of said threaded portions, latch means associated with each of said spring respectively for retaining that spring while the respective shafts are operated, and means for releasing the respective latch means to effect lifting of an implement, whereby an implement at one side of the tractor may be lifted independently of the implement at the other side of the tractor.

18. In combination, an implement-carrying frame, an implement connected to the frame for vertical lifting movement, a rotatable member having a threaded portion and a threaded head member adapted for movement along the threaded portion, a lifting spring connected between the implement and the head member, means for selectively rotating said rotatable member in one direction or in the other, latch means for retaining one portion of the spring when the member is rotated in one direction but being ineffective when the member is rotated in the other direction, means for unlatching the latch means to lift the implement, and said spring when the threaded member is selectively operated in the other direction serving to apply spring pressure on the implement.

19. In combination, a tractor having a power take-off, an implement connected to the tractor for vertical lifting movement, a power device connected with the power take-off including a rotatable member having a threaded portion thereon and means for selectively rotating said rotatable member in one direction or in the other, a threaded head member associated with the threaded portion for movement therealong, a lifting spring connected between the implement and the head member, latch means for retaining one portion of the spring when the member is rotated in one direction but being ineffective when the member is rotated in the other direction, means associated with the threaded head member for automatically unlatching said latch means when a predetermined bias has been placed on the implement to thereby lift the implement, and said spring when the threaded member is selectively operated in the other direction serving to apply spring pressure on the implement.

20. In combination, a tractor having a power take-off, an implement connected at each side of the tractor for vertical lifting movement, a power device connected with the power take-off including a set of opposite gears respectively located at each side of the tractor, a rotatable member having a threaded portion associated with each set of opposite gears, means for selectively making one gear or the other gear of a set effective to rotate the rotatable member in one direction or the other, the selecting means for one side being independent of the selecting means for the other side, a threaded head member connected for movement along the threaded portion of the rotatable members, a lifting spring connected between each implement and its respective rotatable member, latch means associated with the spring for retaining one portion of the spring when the member is rotated in one direction but being ineffective when the member is rotated in the opposite direction, separate means associated with each latch means for releasing the spring to lift the implement, and each spring when the threaded member is operated in the other direction serving to apply spring pressure on the implement, the pressure means for one implement likewise being independent of the pressure for the other implement.

BERT R. BENJAMIN.